Feb. 12, 1924. 1,483,690
T. SPEDDING
BRAKE MECHANISM FOR PEDAL DRIVEN BICYCLES, TRICYCLES, AND LIKE MACHINES
Filed July 22, 1922 3 Sheets-Sheet 1
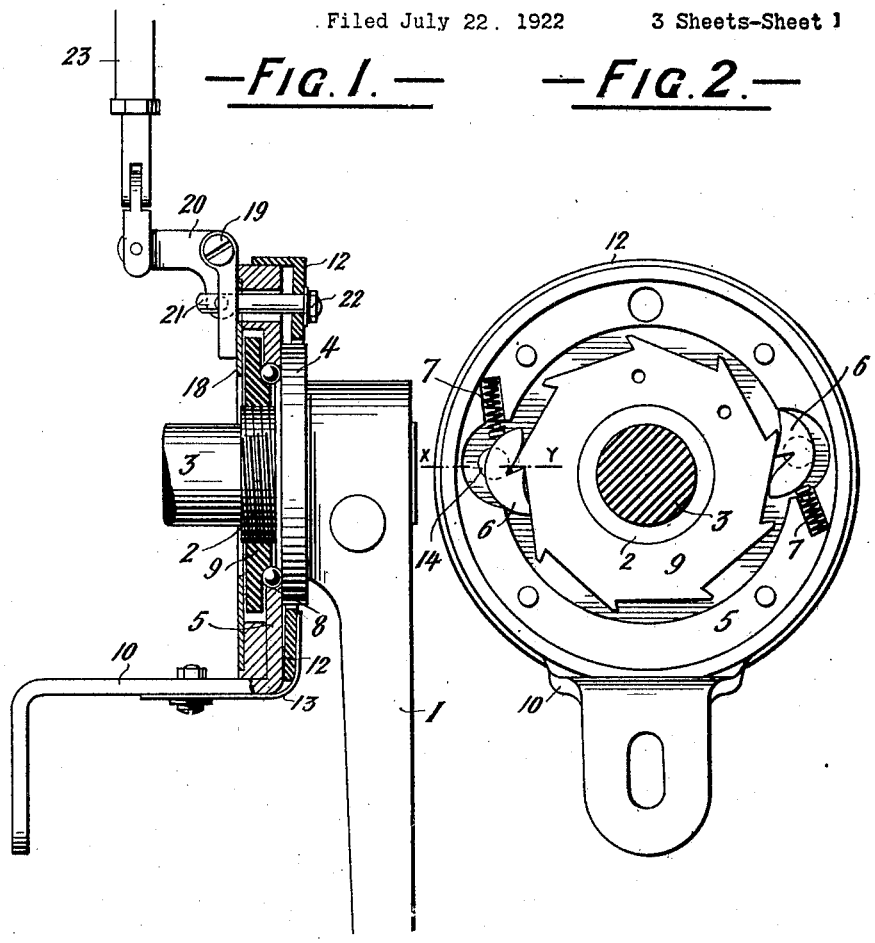
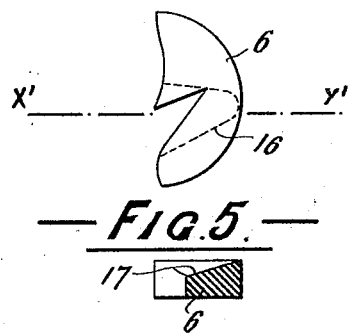
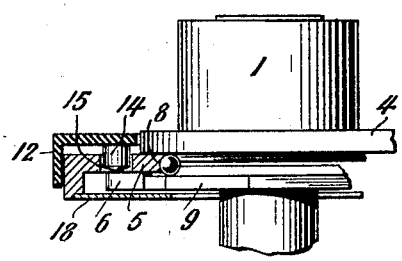

Feb. 12, 1924.
1,483,690
T. SPEDDING
BRAKE MECHANISM FOR PEDAL DRIVEN BICYCLES, TRICYCLES, AND LIKE MACHINES
Filed July 22, 1922    3 Sheets-Sheet 3
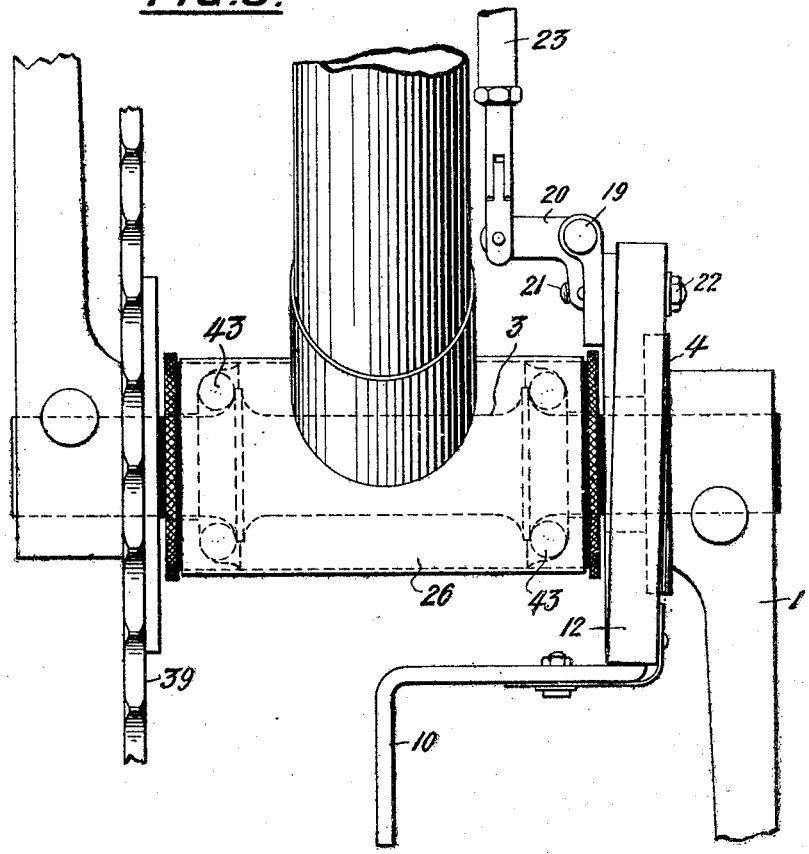
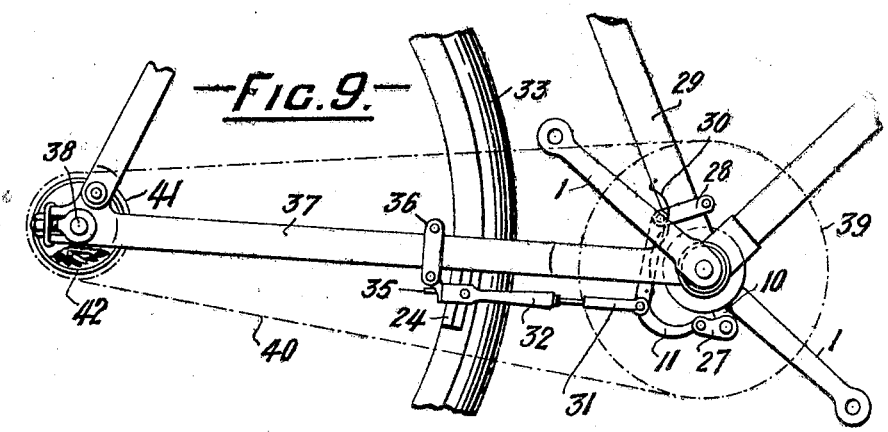

Patented Feb. 12, 1924.

1,483,690

UNITED STATES PATENT OFFICE.

THOMAS SPEDDING, OF WELLING, ENGLAND.

BRAKE MECHANISM FOR PEDAL-DRIVEN BICYCLES, TRICYCLES, AND LIKE MACHINES.

Application filed July 22, 1922. Serial No. 576,851.

*To all whom it may concern:*

Be it known that I, THOMAS SPEDDING, a subject of the King of Great Britain, residing at 233 Cramond Avenue, Welling, Kent, England, have invented certain new and useful Improvements in Brake Mechanism for Pedal-Driven Bicycles, Tricycles, and like Machines, of which the following is a specification.

This invention relates to bicycles, tricycles and similar vehicles of that kind in which a road wheel, or the axle of the road wheel is fitted with an overrunning clutch having sprocket teeth on the periphery of its outer part to engage an endless chain which passes around a sprocket wheel fixed on the crank or pedal axle, so that the road wheel and the portion of the free wheel clutch fixed to said wheel axle may overrun the outer part of the clutch engaging the chain.

When a bicycle is fitted with such an overrunning clutch on the rear road wheel and at the same time with a brake which is to be operated, not by the chain, but directly by the movement of the crank axle in a direction reverse to the driving direction, it is then necessary to fit an overrunning clutch on the crank axle, the outer member of which clutch will become locked to the crank axle when the latter is moved in a rearward direction and be carried with it, and since the brake gear in such a construction is connected to the outer member of the crank axle clutch, the brake is applied.

Such an arrangement is already known, and it suffers from the disadvantages that the brake is applied mechanically if the machine is wheeled rearwardly, and furthermore it suffers from the disadvantage that when driving the pedal crank axle forwardly, the pawl members of the clutch on the crank axle, whether those members be balls, rollers, pivoted pawls or the like, are always in motion, and not only produce unnecessary friction but cause more or less noise, varying in accordance with the accuracy of construction or design which influences the cost of manufacture.

Now the present invention consists in a combination of mechanism comprising a road wheel fitted with any approved or known form of overrunning clutch connected as usual by a chain with a sprocket wheel on the crank axle; the crank axle is fitted with an overrunning clutch whereby it can be turned in a forward direction freely, but when given an angular movement in a rearward direction the crank axle clutch engages its free part, and the said free part being connected to a brake of any suitable form, such as the well known sliding slipper brake, acting on the road wheel, such brake is applied; combined with the above construction means are provided whereby the rider can at will operate a mechanism within reach of his hand, whereby the pawls or equivalent devices of the clutch of the crank axle can be thrown out of operation, and then the machine can be wheeled rearwardly without applying the brake and it can be driven forwardly without the crank axle clutch producing either noise or friction; further, by another manipulation of the control mechanism within reach, the rider can instantaneously bring the back pedalling clutch into action so that the operation of the pedals in a rearward direction will immediately apply the brake.

The invention will be described with reference to the accompanying drawings which show the brake actuating device according to the present invention suitably constructed for use on a bicycle.

Fig. 1 shows in vertical section, the brake-operating clutch mechanism mounted on a crank axle, and Fig. 2 is a face view of the said clutch with the cover plate removed. Fig. 3 is a section through the clutch, taken on the line X—Y of Fig. 2. Figs. 4 and 5 are detail views drawn to an enlarged scale, showing one of the pawls of the clutch removed from its housing in the clutch ring, Fig. 4 being a face view, and Fig. 5 a cross section taken on the line $X^1$—$Y^1$ of Fig. 4.

Fig. 8 shows in front elevation the bottom bracket of a bicycle frame, which carries the bearings of the crank axle, and also shows the cranks on the said crank axle, together with the clutch device according to the invention, and which illustrates the relative location of the parts.

Fig. 9 shows in elevation, taken on the opposite side of the machine to Fig. 6, a pedal driven bicycle, and illustrates the overrunning clutch by which the rear road wheel is driven, and the driving gear in general.

Figure 6:
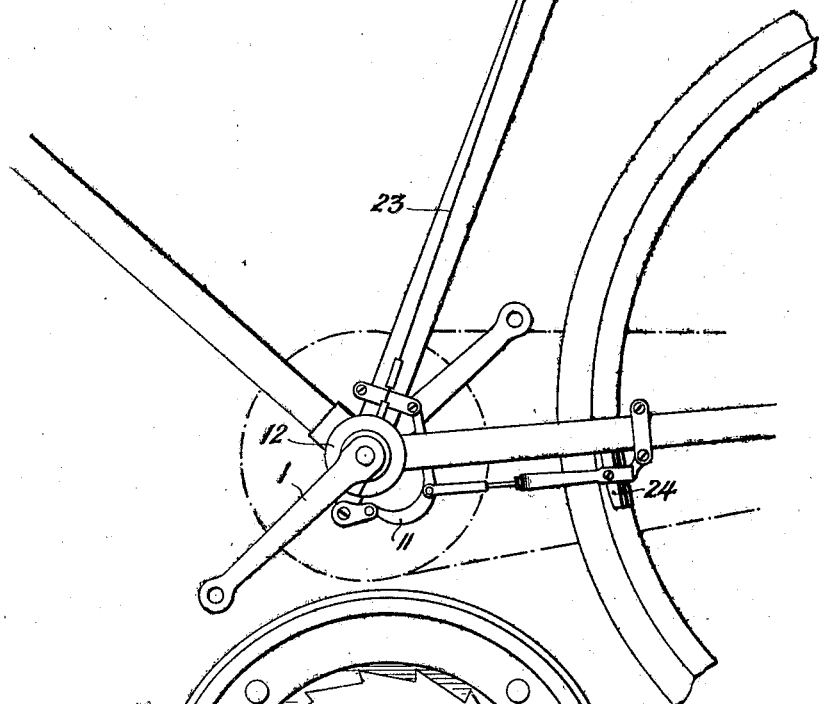
Fig. 6 shows a portion of a bicycle frame with the over-running clutch on the crank axle and means for throwing the same into or out of action by means of a flexible connection to enable a brake to be applied to the rear wheel of the bicycle by a back pedalling action when required.

Referring more particularly to Figs. 1 to 4 of the drawings, the crank 1 is formed with a short tubular extension 2 adapted to fit onto the crank axle 3, and fixed upon the extension 2 adjacent the head of the crank is a plate 4 suitably shaped on its face to form one portion of a ball race. This plate 4 may be screwed on the tubular extension 2 and adapted to receive a spanner or the like. Fitting loosely around the extension 2 is an outer clutch ring 5 recessed to receive two pawls 6 and pressure springs 7, see Figs. 2 and 7, the inner surface 8 of the ring 5 being shaped to form a second portion of the ball race. Screwed upon the extension 2 is a ratchet ring 9, its inner face shaped to complete the ball race and to form an adjusting cone therefor. This ratchet ring, which has preferably an uneven number of ratchet teeth (see Figs. 2 and 7, the preferable construction of the ratchet ring 9 being that shown at Fig. 7), engages each of the spring-pressed pawls 6 in turn and is preferably adapted to receive a spanner.

Fixed to the clutch ring 5 is an arm 10 (Figs. 1 and 2, 8 and 9) extending beneath the bottom bracket 26, Fig. 8. The link 27, Fig. 9, is pivoted to the arm 10 at one end, and at the rearward end is pivoted to one end of a brake lever 11, the opposite end of which is pivoted to a bracket 28 on a tube 29 of the bicycle frame-work, and the brake lever 11 is impelled in a rearward direction by a spring indicated at 30.

Pivoted to the lever 11 is a link 31 connected to the ordinary U-shaped bracket 32 which passes on each side of the road wheel 33, and each arm of the U-shaped bracket 32 carries a brake shoe 24, the shoes being guided each by a pin 35 entering eyes in the brackets 36, one of which is fixed on each of the parallel lower bars 37 which between their rear ends carry the axle 38 of the rear wheel 33. When the link 31 is drawn in a forward direction by the lever 11, as hereafter described, against the action of the spring 30, the brake shoes 24 are applied to the felloe of the road wheel 33.

The crank axle sprocket wheel 39 is indicated at Fig. 9 by dotted lines, and the chain 40 is also indicated by dotted lines, passing over the rear sprocket wheel 41 which forms the exterior ring of the usual overrunning clutch which is indicated at 42. In Fig. 8 a portion of the sprocket wheel 39 is shown, and the bearings 43 of the crank axle 3 are indicated by dotted lines.

A pawl control member consisting of a flanged disc 12, the flange of which nearly circumferentially encloses the periphery of the clutch ring 5, is connected to the extending arm 10 by means of a spring hinge 13, and bearing on the inner face of the disc 12 are two plungers 14, Fig. 3, each plunger passing through a hole 15 formed in the clutch ring 5 in such a position that its head, which is pointed, passes into one of the recesses formed to receive the pawls.

The pawls 6 which each have a segmental outer edge (see Figs. 4 and 5) have a suitably shaped notch formed in their inner edge to receive the teeth of the ratchet ring 9. Upon the under side of each pawl is a recess 16 extending from the outer segmental edge of the pawl to the inner edge, the surface 17 of said recess being sloped from the outer to the inner edge of the pawl, see the sectional view Fig. 5. These recesses are formed in such a position on the under side of the pawls as to receive the pointed ends of the plunger 14.

A cover plate 18 is secured to the face of the clutch ring 5 and carries, upon a bracket fixed thereto, a pin 19 which forms a pivot for a bell-crank lever 20 which is fulcrumed thereon. A pin 21 passing through a hole formed in the clutch ring 5 is pivotally attached at one end to one arm of the bell-crank lever, while its free end passes through the flanged disc 12 and is secured in position by a nut 22. The other arm of the bell-crank lever 20 is attached to the end of a flexible connection 23 by which the clutch mechanism is thrown into or out of action.

When the parts of the brake actuating device on the crank shaft are in the position shown at Figs. 1 and 2 the teeth of the ratchet ring 9 engage one of the pawls 6 carried in the clutch ring 5, and a backward motion of the crank axle will give an angular movement to the clutch ring 5 and extending arm 10. By this means the brake lever 11 will be rocked and the brake 24, see Fig. 6, will be applied to the rim of the bicycle wheel. Upon a forward motion being given to the crank axle, the teeth of the ratchet ring 9 will ride over the pawls 6 and the brake will be immediately released.

Now when it is desired to throw the clutch mechanism out of action a pull is exerted on the flexible connection 23 by means of the lever 25, see Fig. 6, which pull rocks the bell-crank lever 20 and causes the pawl control disc 12 to be moved towards the back of the clutch ring 5 against the action of the spring 13.

This movement of the disc 12 presses the plungers 14 through the holes 15 in the clutch ring and the pointed ends of the plungers enter the recesses 16 formed in the under side of the pawls 6. Continued pressure of the plungers on the sloping faces 17 of the recesses 16 cause the pawls to both move simultaneously outward away from the teeth of the ratchet ring 9 until they are forced into and bear against the walls of the recesses formed in the clutch ring 5 to receive them. It will also be understood that a slight forward movement of the crank axle will facilitate the disengaging movement of the said plunger. The pawls will be held in this disengaged position and the crank axle will run free until the flexible connection 23 is released when the spring hinge 13 again draws the disc 12 away from the back of the clutch ring 5 and the springs 7 press the pawls 6 again into engagement with the teeth of the ratchet ring 9, and the plungers 14 are pushed back by the pawls against the face of the flanged disc 12 and the clutch mechanism can again be used to put on the brake, by a back pedalling motion.

Figure 7:
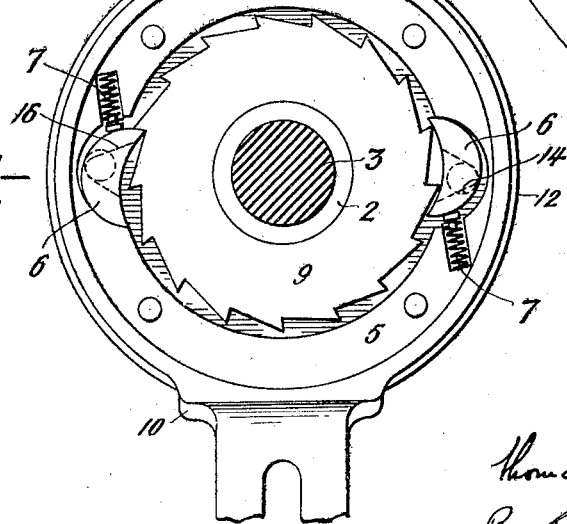
Fig. 7 shows a face view of a clutch of modified construction.

At Fig. 7 a slightly modified form of clutch mechanism is shown in which the pawls 6 are of crescent shape and are not formed with a notch in their inner edges as before described with reference to Figs. 4 and 5, the horns of the crescent-shaped pawls being adapted to engage the teeth of the ratchet ring 9.

What I claim as my invention and desire to secure by Letters Patent is:—

1. In pedal-driven bicycles, tricycles and like machines in which a road wheel has an overrunning clutch by which it is driven and an overrunning clutch on the pedal crank axle to operate a brake directly by a reverse movement of said crank axle; the combination therewith of hand-operable means within reach of the rider, disengaging means in connection with said overrunning clutch on said crank axle, and connecting means between said hand-operable means and said disengaging means, whereby by the operation of said hand-operable means the pawl members of said overrunning clutch on said crank axle can be disengaged by the rider to permit the machine to be wheeled rearwardly without applying the brake or to be driven forwardly with said overrunning clutch of said crank axle out of action, or alternatively when said hand-operable means is placed in another position to permit said overrunning clutch on said crank axle to act to apply said brake to said road wheel by a reverse movement of said pedal-crank axle.

2. In pedal-driven bicycles, tricycles and like machines having a driven road wheel, an overrunning clutch fitted thereto, a crank axle, bearings in the frame of said machine to carry said crank axle, pedal cranks on said axle, a sprocket wheel on said axle and a driving chain passing over the sprocket-toothed ring of said clutch and over said sprocket wheel on said axle; the combination therewith of a brake adapted to act on said road wheel, an overrunning clutch on said axle comprising a central clutch member fixed on said crank axle, a ring member surrounding said central clutch member and pawl members located between said ring member and said central clutch member, connections between said ring member and said brake to operate said brake when said crank axle is moved in a rearward driving direction, means in connection with said overrunning clutch on said crank axle capable of disengaging said pawl members of said overrunning clutch, a hand-operated lever mounted on the framework of the machine within reach of the rider, and mechanical connections between said hand-operated lever and said disengaging means to operate the latter when said hand-operated lever is in one position to disengage said pawl members of said overrunning clutch on said crank axle to permit the machine to be wheeled rearwardly without applying the brake or to be driven forwardly with said overrunning clutch out of action, and when said operating lever is in another position to permit said pawl members of said overruning clutch on said crank axle to act to apply the brake upon a reverse movement of said pedal crank axle.

3. In pedal-driven bicycles, tricycles and like machines having a driven road wheel, an overrunning clutch fitted thereto, a crank axle, bearings in the frame of said machine to carry said crank axle, pedal cranks on said axle, a sprocket wheel on said axle and a driving chain passing over the sprocket-toothed ring of said clutch and over said sprocket wheel on said axle; the combination therewith of a brake adapted to act on said road wheel, an overrunning clutch on said pedal crank axle, said clutch comprising a central clutch member fixed on said crank axle, a ring member surrounding said crank axle, and pawl members located between said ring member and clutch member to permit said clutch member to revolve freely within said ring member when said crank axle is revolved in a forward driving direction and to lock said ring member and said clutch member together when said crank axle is driven in a rearward driving direction, means for connecting said ring member of said crank axle clutch to said brake to apply said brake when said crank axle is turned in a rearward direction, disengagement means in connection with said ring member of said pedal axle overrunning clutch to disenage said pawl members from said clutch member, a hand-operated lever mounted on the framework of the machine within reach of the rider, and connections between said hand-operated lever and said disengaging means to operate the latter when said hand-operated lever is in one position to disengage the pawl members and free said ring member from said clutch member on said crank axle to permit the machine to be wheeled rearwardly without applying the brake or driven forwardly with said crank axle clutch out of action, while when in another position to permit said pawl members to act for applying the brake upon a reverse movement of said pedal crank axle.

4. In pedal-driven bicycles, tricycles and like machines having a driven road wheel, an overrunning clutch fitted thereto, a crank axle, bearings in the frame of said machine to carry said crank axle, pedal cranks on said axle, a sprocket wheel on said axle and a driving chain passing over the sprocket-toothed ring of said clutch and over said sprocket wheel on said axle; the combination therewith of a brake adapted to act on said road wheel, an overrunning clutch on said axle comprising a central clutch member fixed on said crank axle, a ring member surrounding said central clutch member and pawl members located between said ring member and said central clutch member, connections between said ring member and said brake to operate said brake when said crank axle is moved in a rearward driving direction, means in connection with said overrunning clutch to disengage said pawl members comprising a disc adjacent the face of said ring member, a spring to support said disc therefrom, plungers on the face of said disc adjacent said ring member one plunger for each pawl, said disc member having apertures opposite each plunger, said plungers having coned ends and the adjacent faces of said pawls having inclined surfaces to cause said plungers when pressed against said pawls by a movement of said disc to throw said pawls out of action, a hand-operated lever mounted on the framework of the machine within reach of the rider, and mechanical connections between said hand-operated lever and said disc to move said disc towards said ring member to throw said pawls out of action to permit said machine to be wheeled rearwardly without applying the brake or driven forwardly with said overrunning clutch of said axle out of action, and in another position of said operating lever to permit said disc with its plungers to recede from said ring member and permit said pawl members of said overrunning clutch on said crank axle to act to apply the brake upon a reverse movement of said pedal crank axle.

In witness whereof I have hereunto set my hand in the presence of two witnesses.

THOMAS SPEDDING.

Witnesses:
  THOMAS WILLIAM ROGERS,
  WILLIAM A. MARSHALL.